United States Patent [19]
Boutaghou et al.

[11] Patent Number: 6,069,771
[45] Date of Patent: May 30, 2000

[54] GIMBAL MICROPOSITIONING DEVICE

[75] Inventors: Zine-Eddine Boutaghou, St. Paul, Minn.; Joseph C. Liu, Singapore, Singapore

[73] Assignee: Seagate Technology, Inc., Scotts Valley, Calif.

[21] Appl. No.: 08/836,466

[22] PCT Filed: May 6, 1997

[86] PCT No.: PCT/US97/07710

§ 371 Date: May 6, 1997

§ 102(e) Date: May 6, 1997

[87] PCT Pub. No.: WO98/20487

PCT Pub. Date: May 14, 1998

Related U.S. Application Data

[60] Provisional application No. 60/030,276, Nov. 4, 1996.

[51] Int. Cl.[7] ........................................ G11B 5/55
[52] U.S. Cl. ............................. 360/104; 360/109
[58] Field of Search ..................... 360/104, 106, 360/109

[56] References Cited

U.S. PATENT DOCUMENTS

| | | | |
|---|---|---|---|
| 3,678,482 | 7/1972 | Billawala | 340/174.1 |
| 3,924,268 | 12/1975 | McIntosh et al. | 360/78 |
| 4,374,402 | 2/1983 | Blessom et al. | 360/104 |

(List continued on next page.)

FOREIGN PATENT DOCUMENTS

| | | |
|---|---|---|
| 0 412 221 B1 | 11/1989 | European Pat. Off. . |
| 63-122069 | 5/1988 | Japan . |
| 2-263369 | 4/1989 | Japan . |
| 4-134681 | 5/1992 | Japan . |
| 4-368676 | 12/1992 | Japan . |
| 5-094682 | 4/1993 | Japan . |
| 6-020412 | 1/1994 | Japan . |
| 7-085621 | 3/1995 | Japan . |

OTHER PUBLICATIONS

"Silicon Micromachined Electromagnetic Microactuators for Rigid Disk Drives" by Tang et al, *IEEE Transactions on Magnetics*, vol. 31, No. 6, Nov. 1995.

"Magnetic Recording Head Positioning at Very High Track Densities Using a Microactuator–Based Two–Stage Servo System" by Fan et al., *IEEE Transactions on Industrial Electronics*, vol. 42, No. 3, Jun. 1995.

"A Flexural Piggyback Milli–Actuator for Over 5 Gbit/in$^2$ Density Magnetic Recording" by Koganezawa et al, *IEEE Transactions on Magnetics*, vol. 32, No. 5, Sep. 1996.

"Transverse Mode Electrostatic Microactuator for MEMS––Based HDD Slider" by Imamura et al, *IEEE* 1996.

"An Experiment for Head Positioning System Using Sub-micron Track–width GMR Head" by Yoshikawa et al., *IEEE Transactions on Magnetics*, vol. 32, No. 5, Sep. 1996.

"Micro Electrostatic Actuators in Dual–Stage Disk Drives with High Track Density" by Tang et al., *IEEE Transactions on Magnetics*, vol. 32, No. 5, Sep. 1996.

"Piezoelectric Microactuator Compensating for Off–Track Errors in Magnetic Disk Drives" by Imamura et al, *Advance Information Storage Systems*, vol. 5, pp. 119–125.

"A Dual–Stage Magnetic Disk Drive Actuator Using a Piezoelectric Device for a High Track Density" by Mori et al., *IEEE Transactions on Magnetics*, vol. 27, No. 6, Nov. 1991.

(List continued on next page.)

*Primary Examiner*—Jefferson Evans
*Attorney, Agent, or Firm*—Kinney & Lange, P.A.

[57] ABSTRACT

A disc drive system includes a rotatable disc, an actuator arm, and a suspension load beam connected to the actuator arm. A head positioning mechanism includes a motor attached to the suspension load beam. A gimbal has a first end attached to the motor, and a slider carrying a transducing head is attached to a second end of the gimbal. Control Circuitry generates electrical control signals to operate the motor to selectively position the transducing head proximate a predetermined radial location on the rotatable disc.

9 Claims, 4 Drawing Sheets

U.S. PATENT DOCUMENTS

| | | | |
|---|---|---|---|
| 4,605,977 | 8/1986 | Matthews | 360/103 |
| 4,620,251 | 10/1986 | Gitzendanner | 360/103 |
| 4,651,242 | 3/1987 | Hirano et al. | 360/103 |
| 4,853,810 | 8/1989 | Pohl et al. | 360/103 |
| 4,914,725 | 4/1990 | Belser et al. | 318/560 |
| 5,021,906 | 6/1991 | Chang et al. | 360/103 |
| 5,034,828 | 7/1991 | Ananth et al. | 360/75 |
| 5,065,268 | 11/1991 | Hagen | 360/104 |
| 5,079,659 | 1/1992 | Hagen | 360/104 |
| 5,105,408 | 4/1992 | Lee et al. | 369/44.15 |
| 5,177,652 | 1/1993 | Yamaguchi et al. | 360/78.05 |
| 5,189,578 | 2/1993 | Mori et al. | 360/106 |
| 5,255,016 | 10/1993 | Usui et al. | 346/140 |
| 5,276,573 | 1/1994 | Harada et al. | 360/103 |
| 5,521,778 | 5/1996 | Boutaghou | 360/106 |
| 5,552,809 | 9/1996 | Hosono et al. | 347/10 |
| 5,623,461 | 4/1997 | Sohmuta | 369/32 |
| 5,657,188 | 8/1997 | Jurgenson et al. | 360/106 |
| 5,745,319 | 4/1998 | Takekado et al. | 360/78.05 |
| 5,764,444 | 6/1998 | Imamura et al. | 360/109 |
| 5,781,381 | 7/1998 | Koganezawa et al. | 360/106 |
| 5,793,571 | 8/1998 | Jurgenson et al. | 360/104 |
| 5,796,558 | 8/1998 | Hanrahan et al. | 360/106 |
| 5,805,382 | 9/1998 | Lee et al. | 360/104 |
| 5,867,347 | 2/1999 | Knight et al. | 360/104 |
| 5,896,246 | 4/1999 | Budde et al. | 360/104 |
| 5,898,541 | 4/1999 | Boutaghou et al. | 360/109 |
| 5,898,544 | 4/1999 | Krinke et al. | 360/104 |

OTHER PUBLICATIONS

"Dynamic Loading Criteria for 3–1/2 Inch Inline HDD Using Multilayer Piezoelectric Load/Unload Mechanism"by Kajitani et al., *IEEE Transactions on Magnetics,* vol. 27, No. 6, Nov. 1991.

"Design, Fabrication, and Testing of Silicon Microgimbals for Super–Compact Rigid Disk Drives" by Temesvary et al., *Journal of Microelectromechanical Systems,* vol. 4, N.

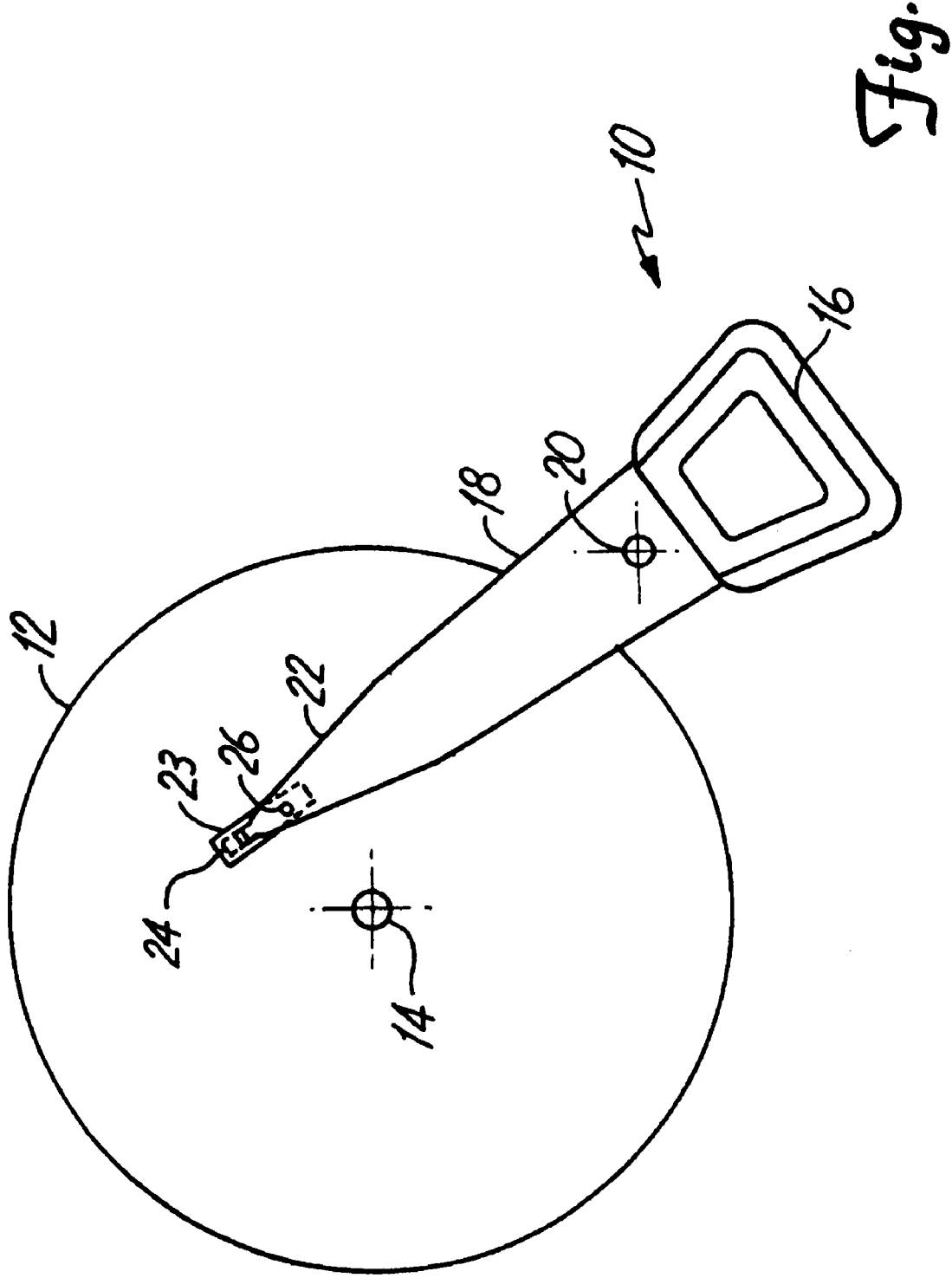

GIMBAL MICROPOSITIONING DEVICE

CROSSW-REFERENCE TO RELATED APPLICATION

This application claims priority from Provisional Application No. 60/030,276 filed Nov. 4, 1996 for "Linear and Rotary Gimbal Micro-Positioning Device" by Z. Boutaghou and J. Liu.

BACKGROUND OF THE INVENTION

The present invention relates to a gimbal micropositioning device, and more particularly to a high-resolution head positioning mechanism having a motor mounted between a head suspension and a gimbal carrying a slider bearing the head, the motor being operable to selectively position the head proximate predetermined locations on a rotatable disc.

The density, or radial spacing, between concentric data tracks on magnetic discs continues to increase, requiring greater precision in head positioning. In the past, head positioning was accomplished by operating an actuator arm with a large-scale motor, such as a voice coil motor, to position a head on a gimbal at the end of the actuator arm. The large-scale motor lacks sufficient resolution to effectively accommodate high track-density discs. Thus, a high-resolution head positioning mechanism is necessary to accommodate the more densely spaced tracks.

One promising design for high resolution head positioning involves employing a high resolution microactuator in addition to the conventional low resolution actuator, thereby effecting head positioning through dual-stage actuation. Various microactuator designs have been considered to accomplish high-resolution head positioning. These designs suggest implementation of small-scale motors using piezoelectric, electromagnetic, electrostatic, capacitive, fluidic, and thermal principles. However, the microactuators were integrated into the design of head suspensions, gimbals and sliders, and thereby had a substantial effect on the performance and design of those components of the disc drive system. For example, where the microactuator was implemented directly on the slider, the complexity of slider design was increased and noise generated by the microactuator and by signal paths to it was induced into the head. Locating the microactuator on the slider also tended to cause electrical interference between the motor and the transducing head due to the close proximity of the motor and transducer. Where the microactuator was to be formed by thin-film wafer techniques onto the gimbal, the entire gimbal assembly had to be redesigned because the microactuator required a silicon substrate support and conventional flexible gimbals were not constructed of silicon. Where the microactuator was implemented at the head mounting block (where the actuator arm connects to the head suspension load beam), high forces were required from the microactuator to move the mass associated with the head suspension at a speed (frequency) large enough to accommodate rapid track access. If the force was not great enough, the microactuator operated with lower natural frequency than was desirable, and track settling time was sacrificed. Therefore, the prior designs did not present ideal microactuator solutions.

There is a need in the art for a simple microactuator design to provide efficient high-resolution head positioning in a dual-stage actuation system, that can be implemented without requiring significant redesign of disc drive system components.

SUMMARY OF THE INVENTION

The present invention is a head positioning mechanism in a disc drive system. The disc drive system includes a rotatable disc, an actuator arm, and a suspension load beam connected to the actuator arm. The head positioning mechanism includes a motor attached to the suspension load beam. A gimbal has a first end attached to the motor. A slider, supporting a transducing head, is attached to a second end of the gimbal. Control circuitry generates electrical control signals to operate the motor to selectively adjust the radial position of the transducing head relative to the rotatable disc.

BRIEF DESCRIPTION OF THE DRAWINGS

FIG. 1 is a plan view of a portion of a disc drive, illustrating a head positioning system.

DETAILED DESCRIPTION OF THE PREFERRED EMBODIMENTS

Figure 2A:
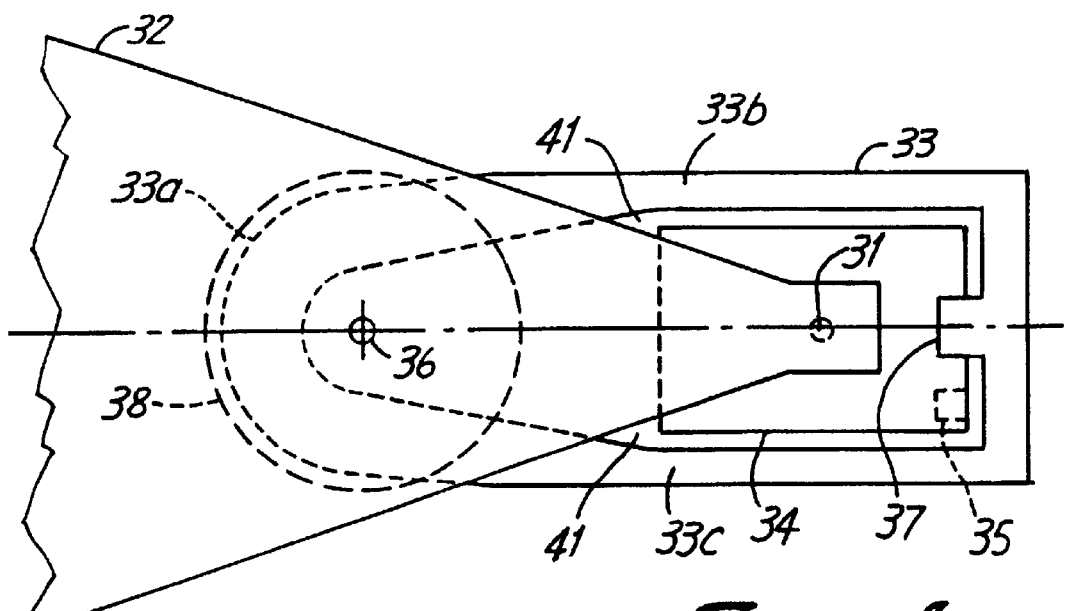
FIGS. 2A and 2B show top and side views, respectively, of a high-resolution head positioning mechanism according to a first embodiment of the present invention.

FIG. 1 shows a head positioning system 10 for positioning slider 24 over a selected track of disc 12, which is rotatable around its axis 14. Voice coil motor (VCM) 16 operates to rotate actuator arm 18 around axis 20, thereby moving slider 24 across concentric tracks of disc 12. Head suspension load beam 22 is connected at one end to actuator arm 18 and at its other end to gimbal or flexure 23, which in turn carries slider 24. In operation, VCM 16 is operated to move actuator arm 18 to position slider 24 over a selected track of disc 12. However, where disc 12 is encoded with a high track density, the resolution of VCM 16 may be insufficient to position slider 24 at a precise location over a selected track. Therefore, a high-resolution positioning mechanism is also desirable. The present invention is directed to a microactuator attached between load beam 22 and gimbal 23.

Figure 2B:
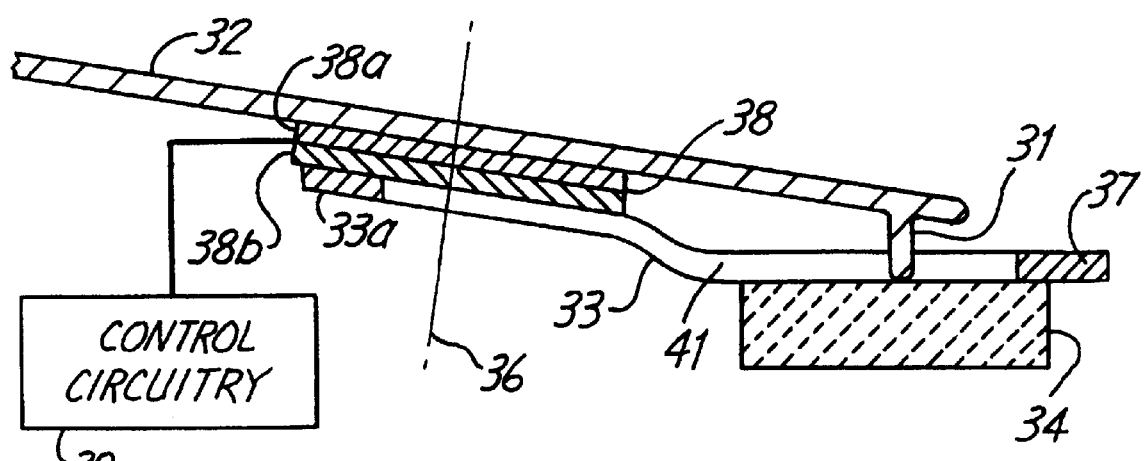

FIGS. 2A and 2B show the high-resolution head positioning mechanism of one embodiment of the present invention. A rotary motor 38 having stator 38a and rotor 38b (depicted symbolically in FIG. 2B) is attached to and between head suspension load beam 32 and gimbal spring 33, preferably with stator 38a attached to load beam 32 and rotor 38b attached to gimbal 33, for example. Slider 34 carries a transducing head 35 and is mounted to gimbal 33 near a distal end of slider 34. Suspension load beam 32 applies a pre-load force against slider 34 via pre-load tip 31.

Gimbal 33 is preferably shaped with an arcuate end portion 33a at a proximal end, and arm portions 33b and 33c extending toward a distal end, forming an aperture 41 between arm portions 33b and 33c. Slider 34 is attached to tongue portion 37 at a distal end of gimbal 33. Arcuate portion 33a of gimbal 33 is attached to rotor 38b of motor 38, so that movement of rotor 38b causes rotation of gimbal 33 about axis 36.

Rotary motor 38 is responsive to control signals from control circuitry 39 to accurately rotate rotor 38b with respect to stator 38a, thereby moving gimbal 33 around axis 36 to position slider 34 over a selected track of a disc. As gimbal 33 and slider 34 rotate, load beam 32 slides across the top surface of slider 34 at pre-load tip 31, inside aperture 41 of gimbal 33.

Because rotary motor 38 is a discrete component separate from the design of head suspension 32, gimbal 33 and slider 34, rotary motor 38 can be implemented with any small-scale motor technology. Examples of suitable small-scale motors include piezoelectric, electromagnetic, electrostatic, capacitive, and thermal motors, each of which is known in the art. For example, a piezoelectric micromotor is disclosed by A. Flynn et al. in "Piezoelectric Micromotors for Microrobots," 1990 Ultrasonics Symposium, pp. 1163–72, and an electrostatic micromotor is disclosed by D. Horsley et al. in "Angular Micropositioner for Disk Drives," Tenth Annual International Workshop on Micro Electro Mechanical Systems, Nagoya, Japan, Jan. 26–30, 1997. Generally, such micromotors operate via parallel plates attached to a fixed outer ring (stator) and mobile inner ring (rotor) of the motor in opposing pairs. A control signal, such as a voltage, is applied to the pairs of plates to rotate the central rotor with respect to the stator by motion induced in the plates. The design flexibility of the present invention, which permits the use of several existing micromotor designs, greatly simplifies the design of high-resolution head positioning mechanisms for disc drives.

In a preferred embodiment, gimbal 33 has a length sufficient to amplify the radial movement of slider 34 in response to rotational movement of motor 38. Gimbal 33 also preferably has a length sufficient to maintain transducing head 35 a sufficient distance away from motor 38 to minimize electrical interference between motor 38 and the transducing head. It is therefore advantageous to position motor 38 and slider 34 at opposite ends of gimbal 33.

Figure 3A:
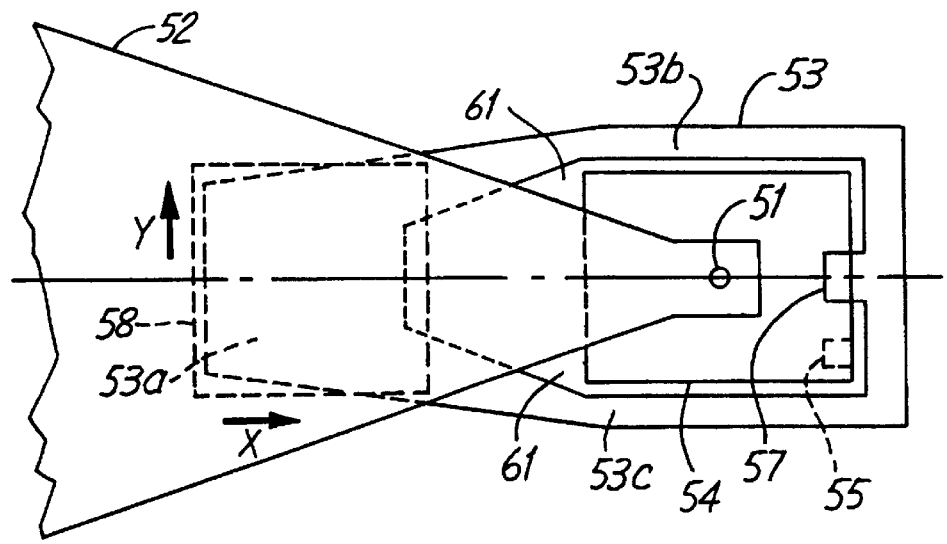
FIGS. 3A and 3B show top and side views, respectively, of a high-resolution head positioning mechanism according to another embodiment of the present invention.
Figure 3B:
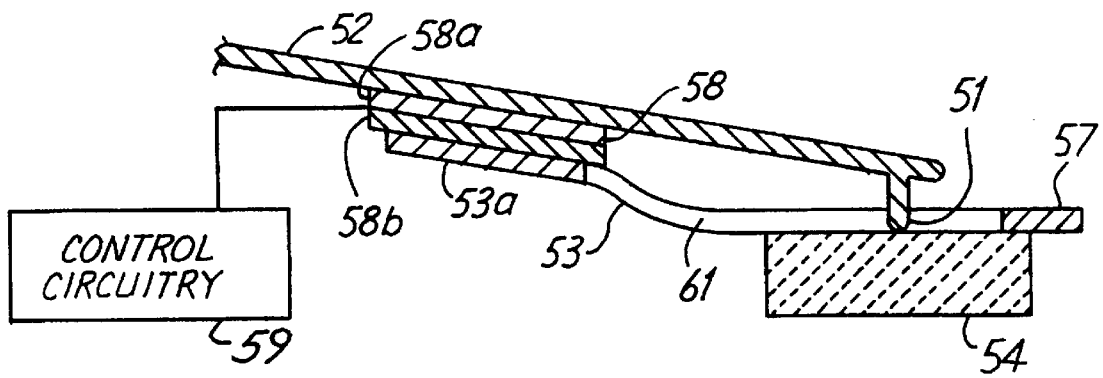

FIGS. 3A and 3B show a high-resolution head positioning mechanism according to another embodiment of the present invention. Linear motor 58 is attached between head suspension load beam 52 and gimbal 53, which in turn carries slider 54 connected to tongue portion 57 of gimbal 53 near a distal end of slider 54. Slider 54 carries transducing head 55 near its distal end.

Gimbal 53 is preferably constructed with rectangular portion 53a at a proximal end, and arm portions 53b and 53c extending toward a distal end, forming aperture 61 between arm portions 53b and 53c. Rectangular portion 53a of gimbal 53 is attached to rotor 58b of motor 58, so that linear movement of rotor 58b in the X and/or Y directions effects rigid-body linear movement of gimbal 53 and slider 54. Suspension load beam 52 applies pre-load force to slider 54 at pre-load tip 51 inside aperture 61 of gimbal 53. Pre-load tip 51 slides across the top surface of slider 54 as movement of slider 54 occurs.

Linear motor 58 is responsive to control signals from control circuitry 59 to linearly expand in the X and/or Y directions. Motor 58 includes stator 58a and rotor 58b (depicted symbolically in FIG. 3B), and is preferably arranged with stator 58a attached to load beam 52 and rotor 58b attached to gimbal 53, so that linear displacement of rotor 58b results in rigid-body motion of transducing head 55. Any two-dimensional movement of transducing head 55 can be achieved by selective displacement (such as expansion or contraction) of motor 58 in the X and Y directions, controlled by signals from control circuitry 59.

Again, because motor 58 is a discrete component separate from the design of head suspension 52, gimbal 53 and slider 54, any small-scale linear motor technology (many of which are known in the art) may be used. Linear micromotors may operate via parallel plates attached to a fixed stator and a mobile rotor of the motor in opposing pairs. A control signal, such as a voltage, is applied to the pairs of plates to move the rotor with respect to the stator. The motor is preferably configured with parallel plates to cause linear motion in the X direction, and parallel plates configured to cause perpendicular linear motion in the Y direction. The design flexibility of the present invention, which permits the use of several existing micromotor designs, simplifies the design of high-resolution head positioning mechanisms for disc drives.

Figure 4A:
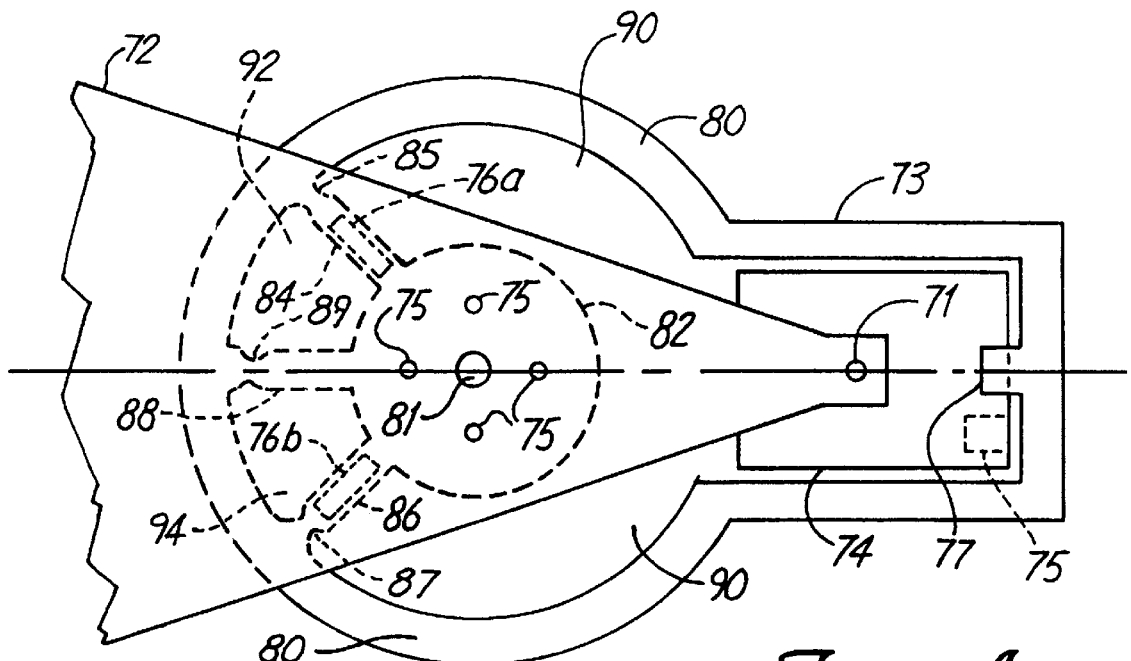
FIGS. 4A and 4B show top and side views, respectively, of a high-resolution head positioning mechanism according to a further embodiment of the present invention.
Figure 4B:
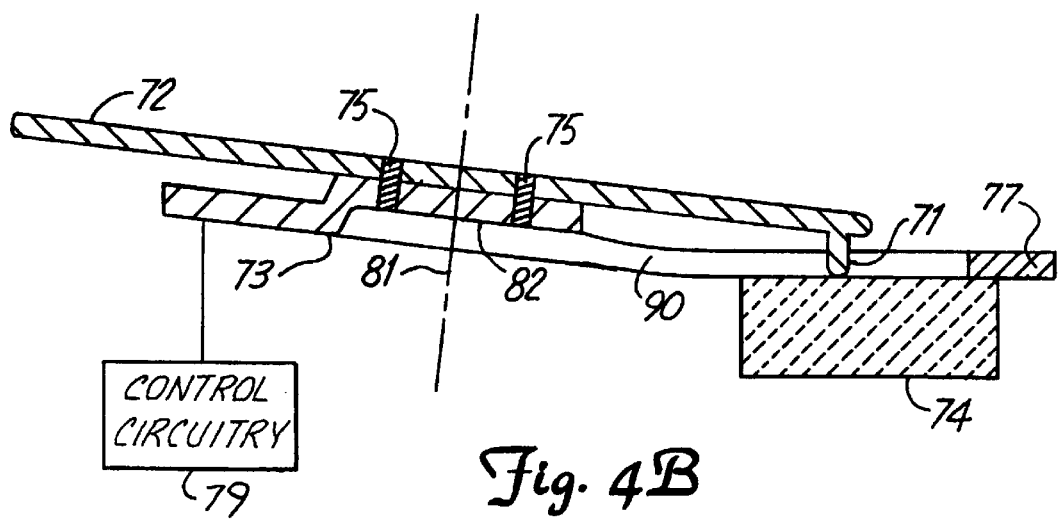

FIGS. 4A and 4B show a high-resolution head positioning mechanism according to a further embodiment of the present invention. This embodiment includes a specially designed small-scale motor integrated into gimbal assembly 73. Slider 74 is attached to tongue portion 77 of gimbal 73 at a distal end of gimbal 73.

The gimbal 73 includes ring portion 80, anchor disc 82 attached to load beam 72 (by welds or adhesive at attachment points 75, for example), and hinges 84, 86 and 88 connecting ring 80 to disc 82. Gimbal 73 is a unitary flexure forming openings 90, 92 and 94 around disc 82 and between hinges 84, 86 and 88. Tab 77 is formed on gimbal 73 at a distal end thereof in opening 90 for attachment to slider 74. Hinges 84, 86 and 88 8 have neck portions 85, 87 and 89, respectively, that are narrow to permit them to bend readily in response to a force applied to hinges 84, 86 and 88. A pair of piezoelectric elements 76a and 76b are rigidly attached to hinges 84 and 86, respectively, and are actuated by an applied voltage from control circuitry 79 to selectively expand and contract, thereby bending hinges 84 and 86, which in turn forces bending of hinge 88. Piezoelectric elements 76a and 76b may alternatively be integrally formed, or embedded, into hinges 84 and 86, respectively. Gimbal 73 may be constructed of steel, for example, or alternatively may be a flex circuit assembly having control circuitry 79 and appropriate connections formed directly thereon. The bending of hinges 84, 86 and 88 elastically distorts ring 80 to alter the position of slider 74 with respect to tracks of a magnetic disc. Gimbal 73, and slider 74 mounted thereon, is thereby effectively rotated in an arc about axis 81 of anchor disc 73b.

Suspension load beam 72 applies pre-load force to slider 74 at pre-load tip 71, inside aperture 79 of gimbal 73. Pre-load tip 71 slides across the top surface of slider 74 as movement of slider 74 occurs.

Piezoelectric elements 76a and 76b are oppositely actuated in response to an applied voltage, so that they act as a complementary pair to distort gimbal 73 in a common direction. In this embodiment, integration with gimbal 73 is achieved, although the nature and stiffness of gimbal 73 is not affected.

Because the present invention locates a small-scale motor where the gimbal attaches to the head suspension load beam, only movement of the gimbal is affected. The microactuating motor can therefore operate at a high frequency, since the natural frequency associated with the gimbal is high. Also, a relatively small force is required from the small scale motor to move the gimbal, due to the small mass of the gimbal and slider. In addition, the flying height of the. slider is unaffected by the addition of discrete microactuator motor between the gimbal and head suspension load beam.

Although the present invention has been described with reference to preferred embodiments, workers skilled in the art will recognize that changes may be made in form and detail without departing from the spirit and scope of the invention.

What is claimed is:

1. A mechanism for positioning a transducing head with respect to a selected track of a rotatable recording disc in a disc drive, the disc drive including an actuator arm and a suspension load beam connected to the actuator arm, the mechanism comprising:

a discrete high resolution motor attached to the suspension load beam;

a gimbal having a first end and a second end, the first end being attached to the motor;

a slider supporting the transducing head, the slider being attached to the second end of the gimbal; and control circuitry generating electrical control signals to operate the motor to move the gimbal as a rigid body relative to the load beam to selectively position the transducing head proximate the selected track on the rotatable recording disc.

2. The mechanism of claim 1, wherein the high resolution motor comprises:

a fixed stator attached to the suspension load beam; and a rotor attached to the first end of the gimbal, the rotor being movable with respect to the stator in response to the electrical control signals generated by the control circuitry.

3. The mechanism of claim 2, wherein the rotor arcuately rotates with respect to the stator in response to the electrical control signals generated by the control circuitry.

4. The mechanism of claim 2, wherein the rotor is linearly displaced with respect to the stator in response to the electrical control signals generated by the control circuitry.

5. The mechanism of claim 1, wherein the gimbal and the high resolution motor comprises:

an anchor disc for attachment to the suspension load beam;

an outer ring portion around the anchor disc;

first and second hinges connecting the outer ring portion to the anchor disc;

a tongue portion for attachment to the slider;

a first piezoelectric element operatively coupled to the first hinge;

a second piezoelectric element operatively coupled to the second hinge; and the first and second piezoelectric elements being responsive to applied voltages to selectively expand and contract to bend the first and second hinges, respectively, thereby distorting the outer ring portion with respect to the anchor disc and altering the position of the slider with respect to the selected track of the rotatable recording disc.

6. A gimbal assembly for positioning a transducing head with respect to a selected track of a rotatable recording disc in a disc drive, the disc drive including an actuator arm and a suspension load beam connected to the actuator arm, the gimbal assembly comprising:

an anchor disc for attachment to the suspension load beam;

an outer ring portion around the anchor disc;

first and second hinges connecting the outer ring portion to the anchor disc;

a tongue portion for attachment to a slider supporting the transducing head;

a piezoelectric element operatively coupled to the first hinge; and the piezoelectric element being responsive to applied voltages to selectively expand and contract to bend the first hinge, thereby distorting the outer ring portion with respect to the anchor disc and altering the position of the slider with respect to the selected track of the rotatable recording disc.

7. The gimbal assembly of claim 6, further comprising a second piezoelectric element operatively coupled to the second hinge, the second piezoelectric element being responsive to the applied voltages to selectively expand and contract to bend the second hinge to complement bending of the first hinge, thereby distorting the outer ring portion with respect to the anchor disc and altering the position of the slider with respect to the selected track of the rotatable recording disc.

8. A micropositioning assembly for radially positioning a transducing head with respect to a selected track of a rotatable recording disc in a disc drive, the disc drive including an actuator arm and a suspension load beam connected to the actuator arm, the micropositioning assembly comprising:

a gimbal supporting a slider carrying the transducing head;

hinge means coupled to the gimbal and to the load beam such that bending of the hinge means effects radial displacement of the gimbal with respect to the load beam;

a piezoelectric element operatively coupled to the hinge means; and the piezoelectric element being responsive to applied voltages to selectively bend the hinge means, thereby altering the radial position of the slider with respect to the selected track of the rotatable recording disc.

9. The micropositioning assembly of claim 8, wherein the hinge means comprises:

an anchor portion attached to the load beam;

an outer portion around the anchor portion integral to the gimbal; and the hinge means connecting the outer portion to the anchor portion, the piezoelectric element being coupled to the hinge means.

* * * * *